United States Patent [19]

Schott, Jr.

[11] 4,272,231
[45] Jun. 9, 1981

[54] AIR COOLING RING FOR PLASTIC FILM WITH INDEPENDENT LUBRICATING AIR FOR FILM GUIDE SURFACE

[75] Inventor: Charles M. Schott, Jr., Atkinson, N.H.

[73] Assignee: Gloucester Engineering Co., Inc., Gloucester, Mass.

[21] Appl. No.: 20,793

[22] Filed: Mar. 15, 1979

Related U.S. Application Data

[63] Continuation-in-part of Ser. No. 859,824, Dec. 12, 1977, Pat. No. 4,145,177.

[51] Int. Cl.³ .......................... B29F 3/08; B29D 7/22
[52] U.S. Cl. ................................ 425/72 R; 264/569; 425/326.1; 425/445
[58] Field of Search .................. 425/326.1, 72 R, 445; 264/569

[56] References Cited

U.S. PATENT DOCUMENTS

| 2,926,384 | 3/1960 | Hertz et al. | 425/72 |
| 2,947,031 | 8/1960 | Chow et al. | 264/569 |
| 3,548,042 | 12/1970 | Hinrichs | 264/569 |
| 4,049,768 | 9/1977 | Luthra | 425/72 R |
| 4,139,338 | 2/1979 | Cole | 425/72 R |

Primary Examiner—Jeffery R. Thurlow

[57] ABSTRACT

Air ring for cooling a hot extruding tube of plastic film in which a lubricating air bleed port communicates with air from the air ring plenum independent of the cooling air flow path. The bleed port communicates with a bleeded air passage that extends to an annular lubricating air outlet positioned in advance of a guide surface that precedes the cooling air outlet. In an exterior air ring a valve arrangement limits the bleeded flow to the minimum desired.

4 Claims, 10 Drawing Figures

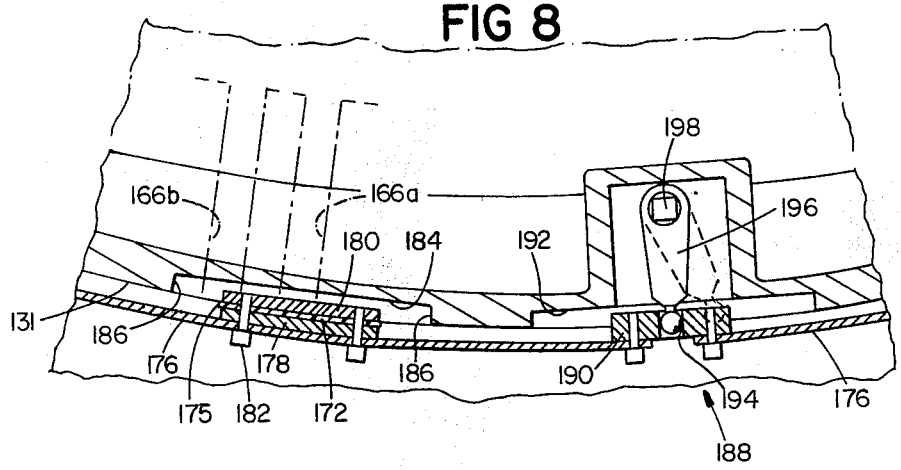
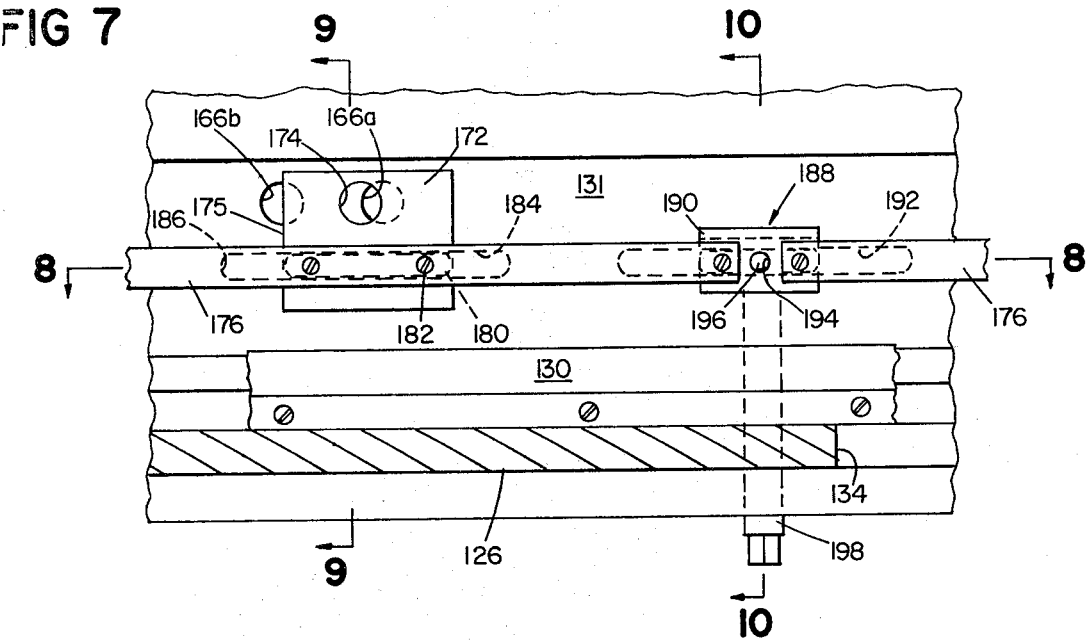
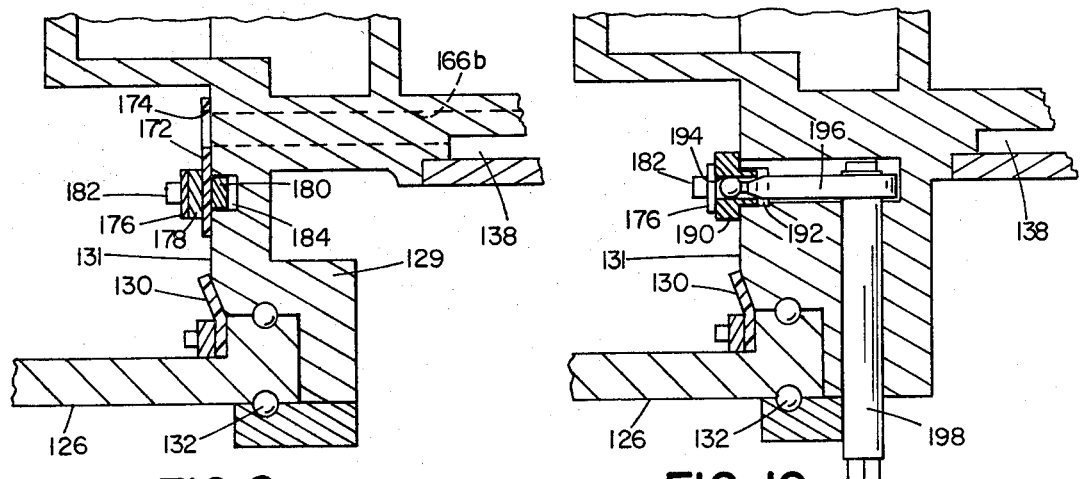

AIR COOLING RING FOR PLASTIC FILM WITH INDEPENDENT LUBRICATING AIR FOR FILM GUIDE SURFACE

This application is a continuation in part of my co-pending application Ser. No. 859,824, filed Dec. 12, 1977, which will issue on Mar. 20, 1979 as U.S. Pat. No. 4,145,177.

BACKGROUND OF THE INVENTION

This invention relates to air cooling apparatus for plastic film that emerges in tubular form from a heated die.

It is well known to employ various combinations of guiding surfaces and air cooling orifices for simultaneous cooling and control of the blown film tube, and to use traveling air cushions of cooling air to prevent the hot plastic from adhering to guiding surfaces in advance of further air cooling. Reference is made for instance to U.S. Pat. Nos. 2,641,022; 3,307,218; 3,307,219; 3,548,042; 3,568,252; 3,577,488; 3,754,067; 3,775,523; 3,835,209; 3,867,083; to British Patent Specification No. 1,045,899; and to the "Dual Cool" air ring described in the commercial literature.

Such arrangements have operated with varying degrees of success. But in respect to each, certain drawbacks are also perceived. With some designs the problems relate to difficulty in adapting a given standard unit to the varying conditions found in the field. Such varying conditions relate, for example, to the different resins employed, the different tube sizes and film gauge thicknesses desired, and the particular different techniques with which personnel of different film production facilities are familiar. Other designs suffer from mechanical complexity or have involved a compromise in either the objective of high production capacity or of ease of start-up and operation.

SUMMARY OF THE INVENTION

According to the invention, it has been realized that a number of the difficulties encountered by the prior art can be solved by making a separation between the lubrication and cooling functions and by deriving the lubricating air in a bleed-off arrangement well upstream in the system, so that the air in the cooling flow path is not significantly affected by variations made in the lubricating air flow when balancing or adjusting the system. Thus, while still enjoying the advantages of a single source for both cooling and lubricating air, a definite separation in flow parameters can be maintained. This avoids any significant mutual dependency, and leads to simplification in equipment construction and operating procedures.

The invention features a circumferentially arranged lubricating air bleed port means communicating with air from the plenum in advance of the generally inwardly extending flow path that leads to the cooling orifice. This bleed port means feeds a bleeded air passage that extends inwardly to an annular lubricating air outlet positioned in advance of the guide surface along the film flow path. A valving means independent of the cooling air flow path enables adjustment of the flow of bleeded lubricating air through the bleed port means and passage, thence to the film guide surface.

Preferred embodiments feature a number of additional important relationships. Preferably, the bleed port means comprises a set of circumferentially spaced-apart holes, the bleed passage being of sufficient length in the direction of flow to enable the separate streams to merge into a uniform lubricating flow. Preferably these holes are arranged in an annular wall and the valve means comprises a circular array of bleed port closures connected to move simultaneously, in dependent fashion, to vary the bleeded flow through the set of holes. Preferably these holes are disposed in an inner circular wall bounding the plenum and the valve means comprises an annular ring which is slidable on the circular wall. In particularly simple embodiments the valve means comprises flexible sheet-form port closures which respond to differential air pressure to press in sealing fashion against the wall at the holes.

In preferred embodiments the bleed holes are disposed in one of the walls bounding the plenum, thus being completely separated from the inlet that feeds the cooling air flow path. In the preferred embodiment illustrated, the bleed part means is positioned in an inner wall of the plenum, below the top of the plenum, while the inlet for cooling air comprises an annular opening at the top of the plenum.

In embodiments which are particularly simple to construct, a wall that defines one side of the cooling air flow path also defines one side of the bleeded air passage, and an annular plate secured to this wall defines the other side of the bleeded air passage.

Another feature of the invention is the provision, in certain embodiments, of connections for supply to the bleed passage of auxiliary air from a second source, e.g., air from the normal compressed air line available in the production plant. This enables an unusually large flow of lubricating air to be employed, e.g., at start-up, while the separation of the cooling and lubrication systems, as mentioned, enables this supply to be received without disturbing the flow parameters in the cooling air path.

These and other objects and features will be understood from the following description of two presently preferred embodiments, taken in conjunction with the drawings, wherein:

FIG. 7 is a cross-sectional view taken on line 7—7 of FIG. 6.

FIG. 8 is a cross-sectional view taken on line 8—8 of FIG. 7.

FIGS. 9 and 10 are cross-sectional views taken on lines 9—9 and 10—10, respectively, of FIG. 7.

There is shown in FIGS. 1-4, a first preferred embodiment. An air ring 10 is associated with a die 12 in the usual manner for cooling the extruding hot film that forms the elongated tube 14.

Figure 1:
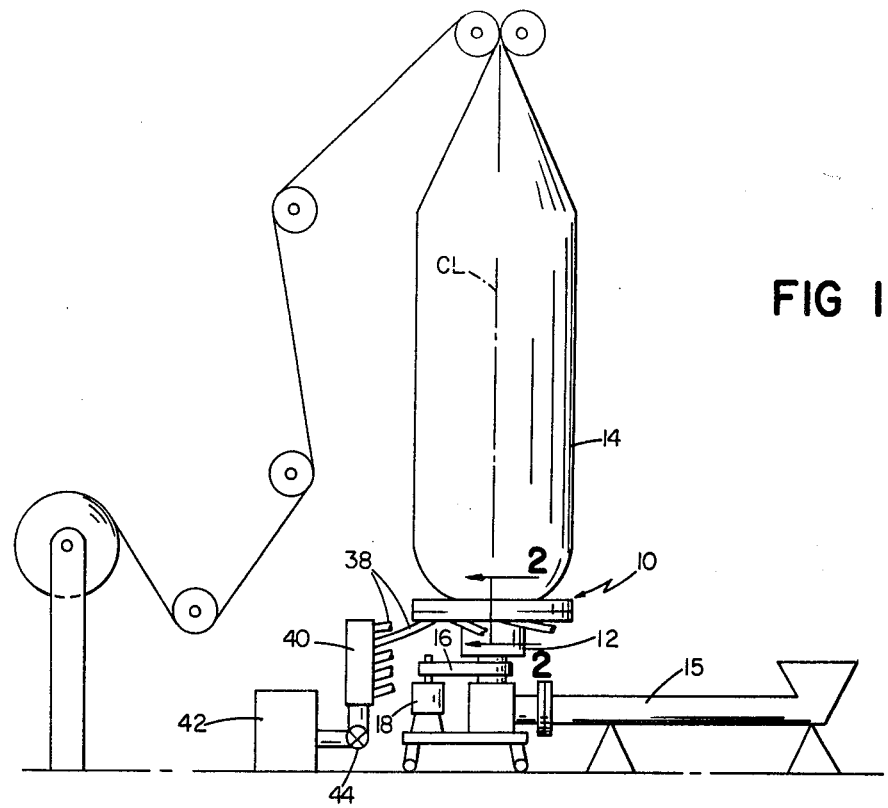
FIG. 1 is a diagrammatic view of a blown film extrusion line.
Figure 2:
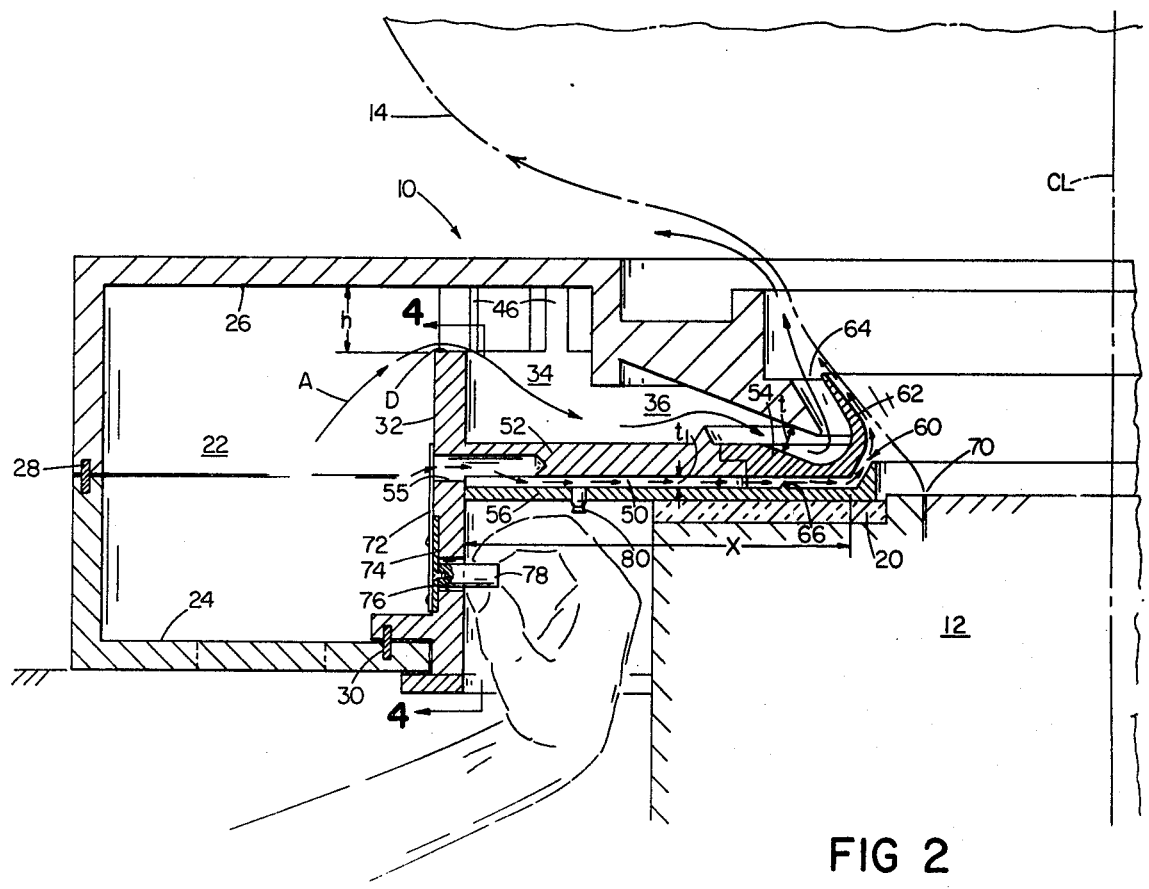
FIG. 2 is a cross-sectional view taken on line 2—2 of FIG. 1 of the external air ring of one preferred embodiment and its relation to the traveling film.
Figure 3:
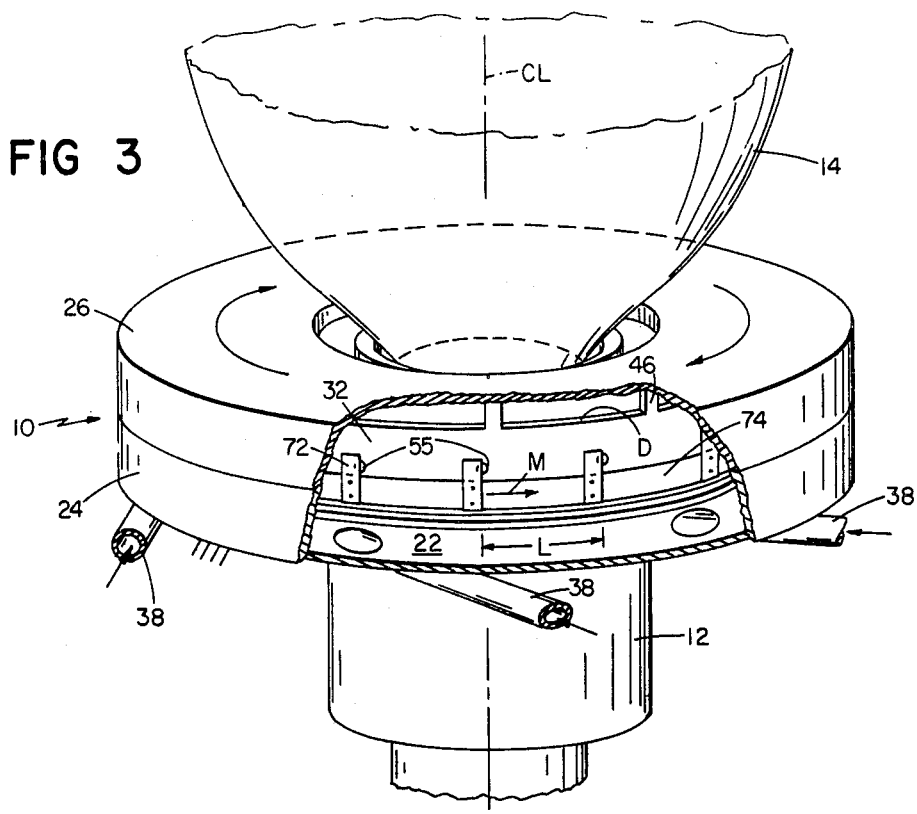
FIG. 3 is a perspective, partially broken away view of the air ring of FIG. 2.

The die 12 is fed by an extruder shown diagrammatically at 15 and the die is rotated by a drive belt 16 driven by motor 18. Referring to FIG. 2, the air ring of this embodiment rests on die 12, being separated there-from by insulation 20. As shown in FIGS. 2 and 3, the air ring comprises an annular hollow plenum 22 of square cross sectional shape, surrounding die center line CL at a substantial distance. The plenum 22 is formed by stationary part 24, comprising the bottom and lower half of the outside cylindrical wall of the plenum, and movable parts 26 and 32, forming the remainder of the square cross-section. Part 24 is sealed to the other parts by anti-friction seals 28 and 30, which permit relative rotation of the parts. The inner cylindrical wall 32 of the plenum is interrupted a short distance h from the top of the plenum, forming a dam D over which air A flows. After passing over the dam the air enters a second, ante-room form annular chamber 34 which discharges to an inwardly progressing cooling air channel 36. This channel at its inner end is turned upwardly to direct air along the path of the extruding film, this being the only source of cooling air in this embodiment.

Plenum 22 is fed, as shown in FIG. 3, by a series of air hoses 38 which receive air from manifold 40 and blower 42, via flapper control valve 44. The hoses 38 introduce a supply of air to the plenum, originating at the plenum floor through discrete inlets from hoses 38. This air swirls about the annular plenum center line, while progressing upwardly. As it swirls, the air has an opportunity to form a substantially continuous ring of air; air A leaves the top of this ring as it flows over the dam D, between a series of circumferentially spaced support columns 46.

Separate from the ante chamber 34 and the cooling flow path 36, there is defined a bleed passage 50. The lower structural members 52 and 54 which form the lower side of the ante chamber 34 and the cooling flow channel 36, also form the upper boundary of the bleed flow path 50. Entry into this bleed flow path is provided in the form of a set of circumferentially spaced bleed ports in the form of drilled holes 55, spaced apart distance L, shown in FIG. 3. These holes penetrate the inner cylindrical wall 32 of the plenum 22 and extend into the thickness of plate 52, being open in their lower sides to the space below plate 52. The bleed flow path is completed by flat plate 56 which extends from plenum wall 32 inwardly to the annular lubricating air outlet 60 adjacent the film path. Film guide surface 62 is positioned downstream in the direction of film travel from lubricating air outlet 60, and the outlet 64 for the cooling air is positioned further downstream. The lower plate 56 rests upon insulation slab 20 which in turn is supported by die 12. As die 12 is rotated by drive motor 18 shown in FIG. 1, plate 56 and the entire interconnected structure rotates. Bottom part 24 of the plenum together with the feed hoses 38 are stationary, for instance they are held stationary by a torque arm which prevents rotation of this part of the plenum while the remainder rotates.

In another embodiment the opposite arrangement is employed in which the bottom part of the plenum 24 is mounted on stationary supports. The remainder of the air ring is then rotatably mounted on stationary part 24, and is independent of the die. This makes it possible to rotate the inner part of the air ring in the direction opposite to the direction of rotation of the die, or to rotate it in the same direction as the die but at a different speed. Such differential rotation is helpful in spreading the effects of any non-uniformities in the cooling process so that a non-uniformity does not appear continually at the same position in tube 14 and in the roll which is wound from the tubular film.

Further details of the air bleed passage 50 and the bleed control structure will now be described. It will be understood that the plates 52 and 54 and the opposed plate 56 define a flat, uniform-depth, radially extending bleed passage 50, this passage being uniform in cross section about center line CL of the die. This radially extending passage terminates at an annular lubricating outlet adjacent the film. Bleed passage 50 is fed by discrete spaced apart bleed-holes 55 in inner wall 32 of the plenum. The radial length X (FIG. 2) of this bleed passage, as well as standing rib 66 located in the bleed passage, insures that the bleeded air reaches the annular lubricating air outlet 60 under uniform conditions throughout the circumference of the outlet.

Figure 4:
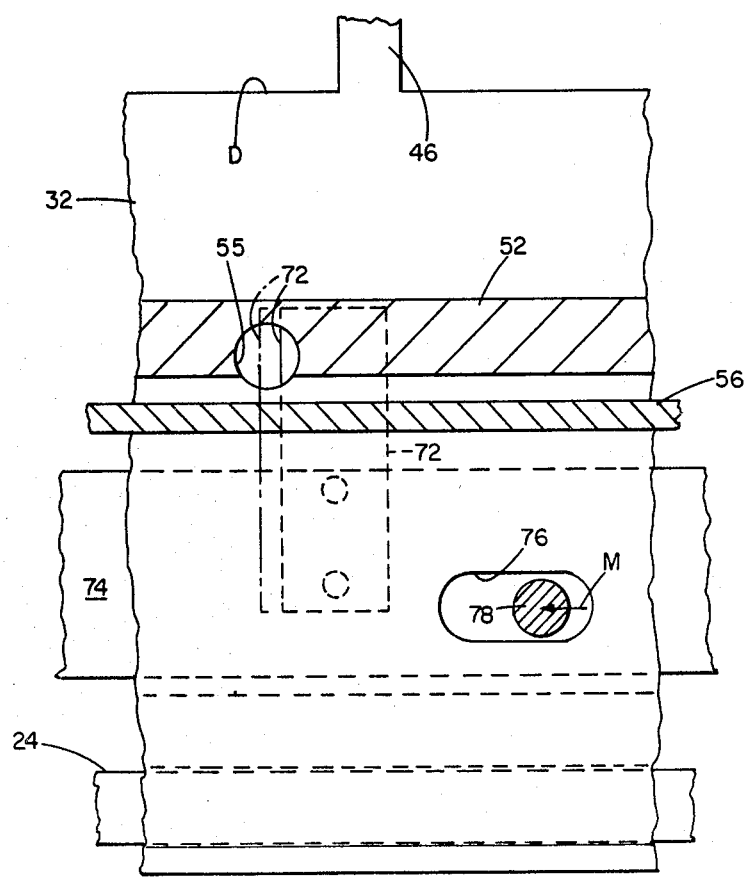
FIG. 4 is a cross-sectional view taken on line 4—4 of FIG. 2.

The purpose of the bleed passage 50 is to supply the needs of lubricating air to move along with the film 14 as it extrudes from the die orifice 70. The positive pressure of the air in the bleed flow path must be low. It must not cause lubricating air to force its own way between the film and the guide surface 62. To achieve this condition, the flow and pressure is limited in controllable fashion. For this purpose a series of valve tabs 72 are arranged at the cylindrical inner wall 32 of the plenum, all being mounted on a hoop-form carrier member 74 which surrounds wall 32, being recessed in an annular groove in this wall. Circumferentially spaced handles 78 are secured to carrier member 74, each extending through an elongated slot 76 in wall 32. This slot, which extends in the circumferential direction, enables movement of the handle in this direction, to rotate the carrier member, and thus the valve tabs 72. As can be seen in FIG. 2, the operator can insert his hand between the die 12 and the plenum 22, grasp one of the handles 78 and move it in the direction of arrow M as shown in FIGS. 3 and 4, with the effect of moving the valving tabs 72, to occlude the bleed ports 55, e.g. from the dotted line position of FIG. 4 to the other line indicated. To the extent that the unoccluded area of each bleed port is left open, a tiny fraction of air is bled from the plenum into the passage 50, to furnish the lubricating demands of the moving film, thus to prevent sticking and to insure proper movement between the plastic film and the guide surface 62.

By such an arrangement, it is possible to positively supply the amount of air needed, while limiting it to the minimum, and to make this air independent of ambient conditions.

The independent regulation of the lubricating air just described enables the flow parameters in cooling flow channel 36 to be unaffected by adjustments being made in the lubricating flow. At start-up it is therefore possible first to adjust the flow of cooling air by flapper valve 44 in the feed line to the manifold 40, and therefore to adjust the lubricating bleed to the amount desired.

At start-up it sometimes is desirable to have more lubricating air available than under other conditions. For this purpose compressed air fittings 80 are provided for optionally introducing compressed air. This can be obtained from the compressed air facilities that are normally available in production plants.

The construction of the occluding tabs 72 may be varied depending upon whether provision is made for the compressed air feature just mentioned. Where there is no provision for entry of compressed air, the pressure in the bleed passage will always be less than that in the plenum. With this construction it is advantageous to use differential air pressure occurring between these two regions for pressing the closure tabs 72 against the wall 32, to effect sealing. In this case the closure element is made for instance of a flexible sheet, e.g. a sheet of nylon of 0.015 in. thickness, which responds to the differential air pressure to lie tightly against the wall 32 around the boundary of the holes 55.

In an embodiment where the compressed gas accessory fittings 80 are provided, the closures are instead made of metal, for instance spring metal with a spring force tending to cause these closures to bear tightly against the wall 32, or rigid metal with adequately close clearance to avoid undue leakage.

In a typical construction the plenum cross section is a 5 inch square dimension, the depth of the flow over the dam at the top of the plenum, dimension h, is 1 inch, the cooling air flow path has a minimum dimension, t, of ½ inch, ten bleed hole ports are provided, each of a diameter of 7/16 inch, and the depth $t_1$ of the bleed passage is 3/16 inch. Rib or dam 66 provided in the bleed passage near the lubricating outlet stands ⅛ inch above the surface of the lower plate 54, thus reducing the bleed passage at that point to 1/16 inch depth.

Figure 5:
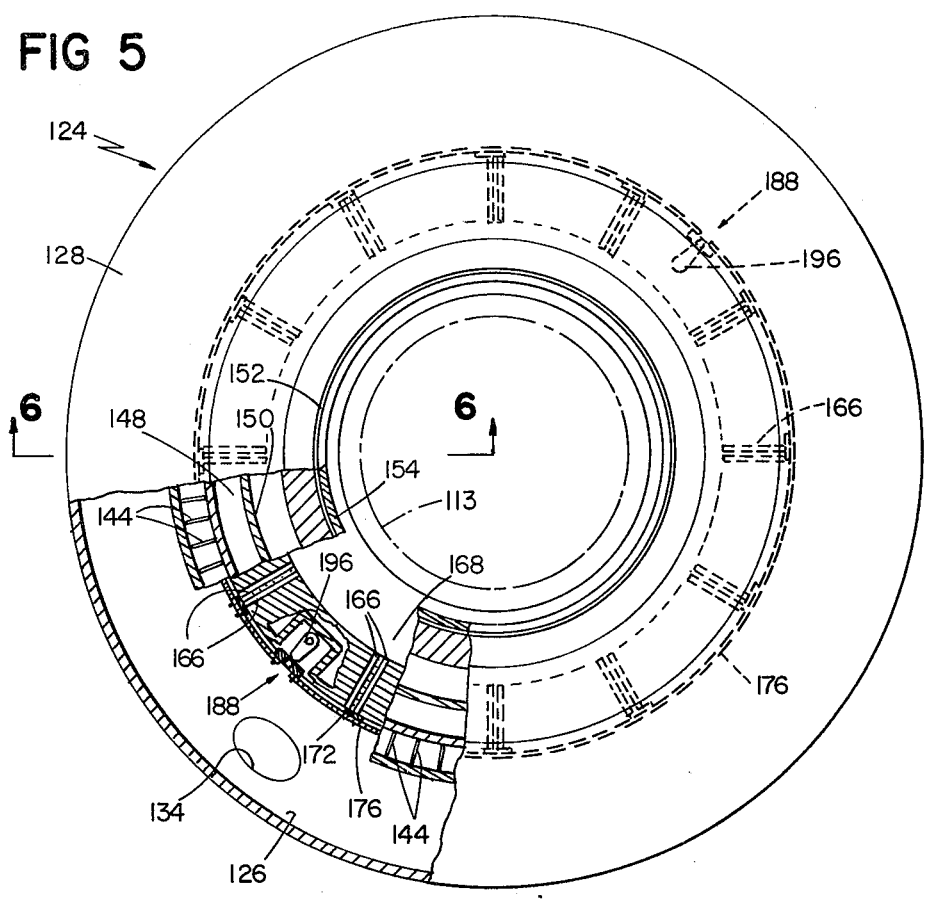
FIG. 5 is a plan view, partially broken away, of the external air ring of a second and most preferred embodiment.

There is shown in FIGS. 5 through 10 a second and most preferred embodiment. Referring to FIG. 5, air distributing ring 124 includes a stationary annular lower element 126 to which hoses are tangentially connected, sloped at 20 degree angles from the horizontal. Above the stationary lower element and sealed to it by seals 130, is a rotating assembly comprised of upper and lower elements 128, 126. Ball bearings 132 support stationary lower element 126 on lower rotating element 129 (see FIG. 9), lower element 129 being supported by the rotating die 112. Inlets 134 for air incoming from the hoses are located in the bottom of stationary element 126.

An annular plenum 136 is defined by elements 126, 128, 129 of the distributing ring. Annular outlet 140 (2 inches high, $h_1$), remote from the inlet 134, at the top of inside wall 141, communicates inwardly with the upper part of an annular finned chamber containing vertical fins 144 spaced every 1.5 inches around the circumference. Fins 144 are injection molded plastic (or alternatively formed of aluminum sheet), 1.5 inches wide radially, 4.5 inches long vertically, and with ⅛ inch thickness at their radial midpoint and some fairing at leading and trailing edges. Annular outlet 146 (1 inch high, $h_2$) through wall 149, at the lower end of the finned chamber, communicates with further chamber 148. Outlet 146 thus establishes a path length P (approximately 3 inches in length) along the fins from the inlet at 140, a path that is greater in length than the circumferential spacing between adjacent fins. Chamber 148 is divided radially by cylindrical vertical wall 150. Generally horizontal passage 151 supplies air from chamber 148 to annular cooling outlet 152 through a gooseneck-shaped passage. Vertical baffle element 158 controls the shape of the air path adjacent the bubble above outlet 152.

Pressurized air from the blower enters plenum 136 through inlets 134 from hoses which are inclined to the horizontal at 20 degrees. The flow bends so as to be substantially horizontal as it enters, and forms a swirling mass within plenum 136. As the swirling air progresses from level I at the bottom of the plenum to level II at the upper level, interaction of the swirling air with the confining walls breaks up localized regions of vorticity and other nonuniformities and produces at the top of the plenum a generally uniform, swirling torus of air. Air from this uniform torus is progressively removed at outlet 140 and directed inwardly. It is split into a multiplicity of isolated streams by the fins, without impeding continued flow-evening rotation of the supply torus. These discrete air streams, as they pass through extended paths P between the fins 144, have a nonuniform inward velocity profile, with highest velocity adjacent the face of the fin that faces the oncoming flow, and lowest velocity at the other side of each fin. During the course of passage through the fin assembly the streams are changed in their flow direction from circumferential to radial by flow-straightening action of the fins, and move downward and radially inward. The streams leave the finned chamber through outlet 146 where they merge again into a single annular, inwardly flowing stream. From there the stream moves upward and inward over wall 150 in chamber 148, and then through horizontal passage 151 to cooling outlet 152, where the air is turned upward and slightly radially outward before being directed against the bubble exterior. The path between outlet 146 and cooling outlet 152 is sufficiently long to permit the nonuniform radial velocity distribution produced at the fins to be evened out.

A separate annular bleed passage 138 extends from plenum 136 beneath the main cooling flow structure to lubricating air outlet 160, adjacent die orifice 113. Structural members 162, 164 form the upper surface of the annular bleed passage as well as the lower surface of the main cooling passage. Entry into bleed passage 138 is provided through a series of twenty four circumferentially-spaced holes 166, grouped in pairs (FIG. 5). The holes penetrate member 129 and open into the space below member 162. The bleed passage is defined on its lower side by flat plate 168 extending from member 129 inwardly to lubricating orifice 160. Plate 168 rests on insulation slab 170, supported on die 112. Sufficient radial path length is provided by bleed passage 138 to assure that bleed flow emerging from lubricating outlet 160 is circumferentially uniform.

As die 112 is rotated by the drive motor, plate 168 and the entire interconnected structure defining the cooling and bleed passages rotate. Element 126 and the hoses remain stationery, held by a torque arm.

Figure 6:
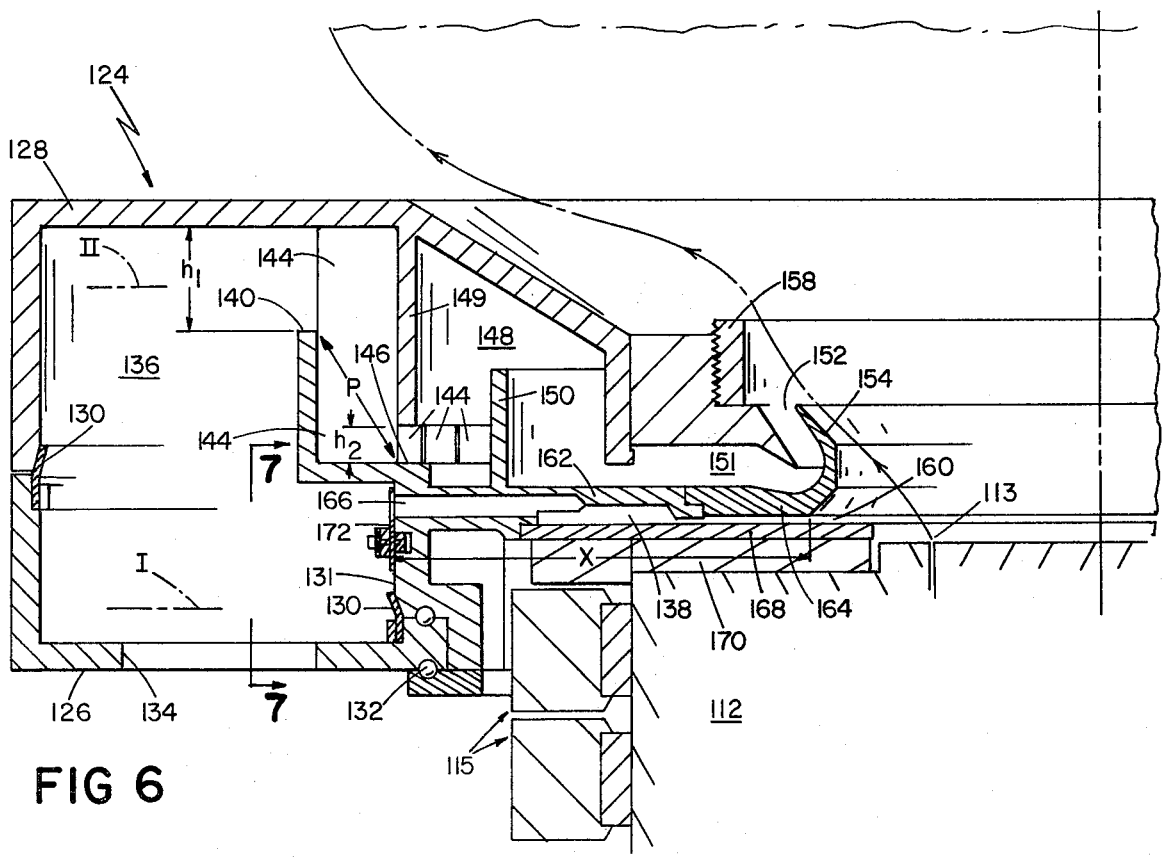
FIG. 6 is a cross-sectional view taken on line 6—6 of FIG. 5.

Flow through the bleed passage 138 is adjusted by moving a series of valve tabs 172 to partially cover the inlets to holes 166 (FIG. 6). The valve tabs are rectangular sheets (FIG. 7) of nylon (1/32 inch thick) with low friction qualities. Each valve tab has round hole 174 for covering the inlet of a first hole 166a of each pair of holes. Straight edge 175 of tab 172 covers the inlet of a second hole 166b. Each tab 172 is slightly curved to mate with the inner wall of the plenum.

Tabs 172 are supported on a tension band formed by two band segments 176 which together extend around the entire circumference of the outer wall 131 of plenum 136 (FIG. 5). Each tab is sandwiched between a pair of clamps 178, 180, secured to each other and to band segments 176 by screws 182 (FIG. 8). The clamp on the inside of the band slides in groove 184 in the outer wall 131. The groove provides radial clearance for inner clamp 180 and stop surfaces 186 to limit circumferential movement of the tension band.

The band segments 176 are joined at two diametrically opposed locations 188 (FIG. 8). At these locations the ends of the segments are clamped by screws 182 to joining members 190 which slide in grooves 192. Each member 190 has a central aperture 194 that engages the end of rotating pusher arm 196 which is, in turn, fixed to vertical adjustment shaft 198 (FIG. 10) supported for rotation in structural member 129. Camming surfaces on the end of pusher arms 196 engage sides of apertures 194 in joining members 190.

The tension band is loaded tensilely so as to force nylon valve tabs 172 inward against the plenum wall. The tensile load in the band is achieved by first fastening the band segments to joining members 190 and then prying the band radially outward sufficiently for it to fit over clamps 178.

Valve tabs 172 are also pressed against the plenum wall by the differential pressure across that portion of the tab covering the inlet to holes 166.

To adjust the flow of air entering bleed passage 138, one or the other of adjustment shafts 198 is turned with a wrench. This rotates the corresponding pusher arm 196 and, in turn, moves band 176 circumferentially to expose more or less of the inlets to holes 166.

This adjustment technique assures that air is admitted uniformly about the circumference. And the adjustment is provided in a compact manner, i.e., little radial space between the die assembly (die 112 and heaters 115) and the plenum 136 is required for arms 196 and adjustment shafts 198.

In conclusion, it will be understood that in all embodiments of the invention virtually the entire flow of air from the feed hoses enters the plenum, merges into an annular ring of air and progresses over the dam and thence into the cooling channel, through which it proceeds to the plastic film for cooling. A virtually imperceptible quantity of air, with no substantial effect upon the total volume of air of the cooling air, is bled from the plenum and proceeds through the narrow bleed path to provide a lubricating barrier between the plastic film and the guide surface 62.

It will be understood that numerous variations in the specific details are within the spirit and scope of the invention. For example, the tension band could be a single piece extending around the plenum wall with tension provided by a spring joining the two ends of the band.

What is claimed is:

1. In an air ring for cooling the exterior of a hot extruding tube of plastic film, including a ring-form plenum supplied with cooling air, means defining a generally inwardly progressing cooling air flow path receiving air from the plenum and leading to an annular cooling orifice that discharges cooling air into contact with the plastic film, means defining a film guide surface upstream along the film path preceding said orifice, and means for supplying air to move with the film between the film and the guide surface, that improvement comprising a circumferentially arranged lubricating air bleed port means communicating with air from said plenum independent of said inwardly progressing cooling air flow path, said bleed port means communicating with a bleeded air passage extending inwardly from said bleed port means to an annular lubricating air outlet positioned in advance of said guide surface, and valving means independent of said cooling air flow path for adjusting the flow of bleeded lubricating air, said bleed port means comprising a set of circumferentially spaced-apart discrete holes, said bleed passage being of sufficient length in the direction of flow to enable the discrete flow from said bleed holes, to produce a merged, substantially uniform lubricating flow at said lubricating outlet, said bleed holes being arranged in an annular wall, said valve means comprising a circular array of bleed port closures connected for movement together to simultaneously, dependently vary the bleeded flow through said set of holes, said bleed port closures being moved together by moving a tension band to which said closures are attached, and said band being wrapped around said annular wall.

2. The air ring of claim 1 further comprising pusher arm means for pushing on said tension band to move it circumferentially and thereby to move said port closures relative to said bleed holes.

3. The air ring of claim 2 further comprising shaft means for rotating said pusher arm means, said shaft means being positioned radially between said air ring and the die from which said tube is extruded, whereby little radial space between said ring and die is required, thereby providing a compact structure.

4. The air ring of claim 1 or 3 wherein
   said port closures are discrete tab members, said tab members extending axially from said band to occlude holes in said annular wall of said plenum, said holes communicating with said bleeded air passage,
   said air ring further comprises clamp means for attaching said tab members to said tension band, and
   said annular wall includes grooves for receiving the inner portions of said clamp means, to guide said band, clamp means, and tab members in circumferential movement to adjust the occlusion of said holes.

* * * * *